US011599793B2

(12) United States Patent
Dinh et al.

(10) Patent No.: US 11,599,793 B2
(45) Date of Patent: Mar. 7, 2023

(54) DATA INTEGRATION DEMAND MANAGEMENT USING ARTIFICIAL INTELLIGENCE

(71) Applicant: Dell Products L.P., Round Rock, TX (US)

(72) Inventors: Hung T. Dinh, Austin, TX (US); Sandeep Govindraj, Round Rock, TX (US); Ranjani Muthyam Venkata, Leander, TX (US); Sabu K. Syed, Austin, TX (US); Kannappan Ramu, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 477 days.

(21) Appl. No.: 16/776,900

(22) Filed: Jan. 30, 2020

(65) Prior Publication Data

US 2021/0241087 A1    Aug. 5, 2021

(51) Int. Cl.
*G06Q 10/06* (2023.01)
*G06N 20/20* (2019.01)
*G06F 17/18* (2006.01)
*G06N 3/08* (2023.01)
*G06F 40/30* (2020.01)
*G06N 20/00* (2019.01)
*G06N 3/10* (2006.01)
*G06N 3/086* (2023.01)

(52) U.S. Cl.
CPC .............. *G06N 3/08* (2013.01); *G06F 40/30* (2020.01); *G06N 3/086* (2013.01); *G06N 3/10* (2013.01); *G06N 20/00* (2019.01)

(58) Field of Classification Search
CPC ............ G06N 3/08; G06N 3/086; G06N 3/10; G06N 20/00; G06N 3/04; G06F 40/30; G06F 40/216; G06Q 10/04
See application file for complete search history.

(56) References Cited

U.S. PATENT DOCUMENTS

| 10,769,588 B1 * | 9/2020 | Kim .................... G06F 16/9535 |
| 2006/0106599 A1 * | 5/2006 | Horvitz ................. G06T 3/4092 |
| | | 704/219 |
| 2018/0060056 A1 | 3/2018 | Shlomai et al. |

(Continued)

*Primary Examiner* — Brandon S Cole
(74) *Attorney, Agent, or Firm* — Ryan, Mason & Lewis, LLP

(57) ABSTRACT

Methods, apparatus, and processor-readable storage media for data integration demand management using artificial intelligence are provided herein. An example computer-implemented method includes obtaining at least one data integration demand, wherein the at least one data integration demand comprises textual information provided by at least one user; determining multiple parameters of the at least one data integration demand by applying one or more machine learning natural language processing techniques to at least a portion of the textual information provided by the at least one user; generating at least one delivery date prediction for the at least one data integration demand by applying one or more artificial intelligence techniques to the multiple determined parameters of the at least one data integration demand; and performing one or more automated actions based at least in part on the at least one generated delivery date prediction.

20 Claims, 6 Drawing Sheets

(56) References Cited

U.S. PATENT DOCUMENTS

| | | | |
|---|---|---|---|
| 2018/0143975 A1* | 5/2018 | Casal | G06F 40/51 |
| 2018/0284758 A1* | 10/2018 | Cella | G06N 7/005 |
| 2019/0130354 A1* | 5/2019 | Han | G06Q 10/08355 |
| 2019/0179664 A1 | 6/2019 | Gujarathi et al. | |
| 2019/0332357 A1 | 10/2019 | Reddy | |
| 2019/0356760 A1 | 11/2019 | Ritter et al. | |
| 2020/0160268 A1* | 5/2020 | Han | G05D 1/0291 |
| 2020/0210947 A1* | 7/2020 | Devarakonda | G06Q 10/08355 |

* cited by examiner

```
#use different data transformation libraries using Sklearn.Preprocessing
#Sklearn.metrics
#Sklearn. Neural network , mlp packages, standardscalar,
#sklear.model selection,
#the data converted to StandardsScalar, fit.transformation and then panda dataframe
#the final dataset splits train , test (x, y, test size =20%), using gridsearchCV
#added different hidden layers probability
grid = { hidden_layer_Size:[(10,10),
(20,10),(30,10),(10,20),(20,20),(30,20),(10,30),(20,30),(30,30],
max_iter:[1000, 2000], learning rate_init:[1e-10, 1e-5, 1e-3, 1e-2, 1e-1],
random_state: [420]}
GridSearchCV(cv=10, error_score='raise-deprecating', estimator MLPClassifier(activations ='relu'),
    alpha =0.0001,batch_size='auto', beta_1=0.9, beta_2=0.999, early stopping =False, epsilon=1e08
hidden_layers_size=(10,20), learning rate=0.1, learning rate_init =0.001,
max_iter=200, momentum=0.9,
n_iter_no_change=1000, nesterovs_momentum=True, power_t=0.5,
random_state=420, shuffle=TRUE, solver='adm', tol=0.0001, validation_fraction=0.1, verbose=False
warm_start=False), fit_parameters=none, iid="warm", n_jobs=1, paragrid={ hidden_layer_Size:[(10,10),
    (20,10),(30,10),(10,20),(20,20),(30,20),(10,30),(20,30),(30,30],
max_iter:[1000, 2000], learning rate_init:[1e-10, 1e-5, 1e-3, 1e-2, 1e-1],
random_state: [420]}, predispatch='2*n_jobs", refit=True, return_train_score="warm", scoring=None, verbose=0)

#After Gridsearch , we observed the best parameter { hidden_layer_Size:[(10,20),
learning rate_init:[0.1], max_iter:1000
random_state: [420] } with best mean CV accuracy: 87%, holdout test set accurcay:72%
```

FIG. 3

DATA INTEGRATION DEMAND MANAGEMENT USING ARTIFICIAL INTELLIGENCE

FIELD

The field relates generally to information processing systems, and more particularly to techniques for processing data across applications using such systems.

BACKGROUND

Applications routinely exchange data, and data integration demands commonly accompany the exchanges, possibly in the form of one or more requests. Such integration services facilitate communication between information processing systems. Conventional data integration demand management techniques include estimating delivery dates for data integration demands manually via time-intensive and labor-intensive processes. However, such conventional techniques are prone to human error and/or lack accuracy, which can negatively affect user experience and enterprise efficiencies.

SUMMARY

Illustrative embodiments of the disclosure provide techniques for data integration demand management using artificial intelligence (AI). An exemplary computer-implemented method includes obtaining at least one data integration demand, wherein the at least one data integration demand comprises textual information provided by at least one user, and determining multiple parameters of the at least one data integration demand by applying one or more machine learning natural language processing techniques to at least a portion of the textual information provided by the at least one user. The method also includes generating at least one delivery date prediction for the at least one data integration demand by applying one or more artificial intelligence techniques to the multiple determined parameters of the at least one data integration demand. Further, the method additionally includes performing one or more automated actions based at least in part on the at least one generated delivery date prediction.

Illustrative embodiments can provide significant advantages relative to conventional data integration demand management techniques. For example, challenges associated with human error and/or inaccuracy are overcome in one or more embodiments through automatically determining predictive data integration demand delivery dates using AI techniques.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for an AI model utilized in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
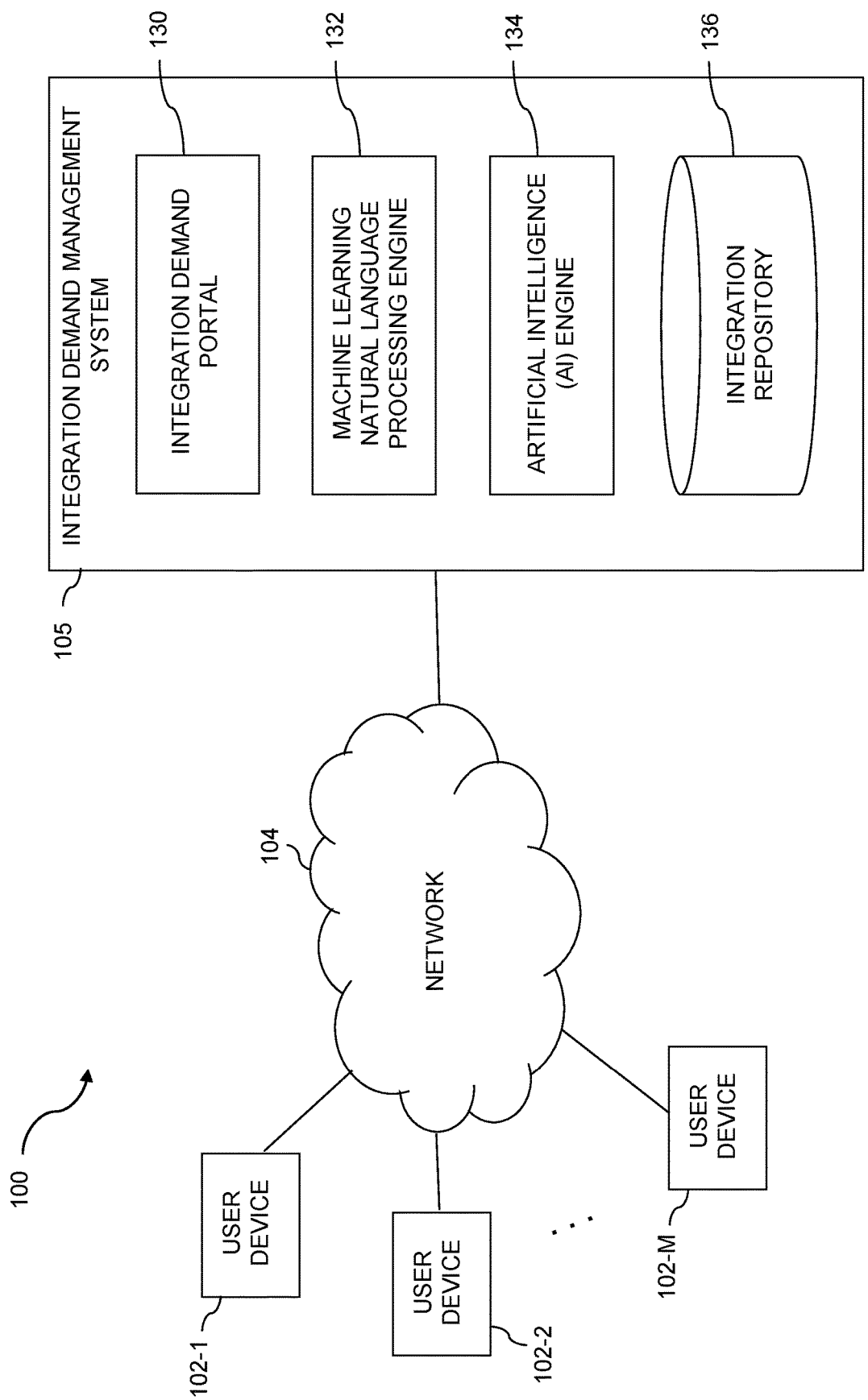
FIG. 1 shows an information processing system configured for data integration demand management using AI in an illustrative embodiment.

FIG. 1 shows a computer network (also referred to herein as an information processing system) 100 configured in accordance with an illustrative embodiment. The computer network 100 comprises a plurality of user devices 102-1, 102-2, ... 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is integration demand management system 105. As used herein, a "demand" refers to at least one data delivery request.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the integration demand management system 105 can have an associated integration repository 136 configured to store data pertaining to various applications and/or user devices 102, wherein such data can comprise, for example, data associated with multiple fields describing and/or detailing data integrations.

The integration repository 136 in the present embodiment is implemented using one or more storage systems associated with the integration demand management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

In at least one embodiment, the integration demand management system 105 can also be associated with one or more input-output devices, which illustratively comprise keyboards, displays or other types of input-output devices in any combination. Such input-output devices can be used, for example, to support one or more user interfaces to the integration demand management system 105, as well as to support communication between the integration demand management system 105 and other related systems and devices not explicitly shown.

Also, the integration demand management system 105 in the FIG. 1 embodiment is assumed to be implemented using at least one processing device. Each such processing device generally comprises at least one processor and an associated memory, and implements one or more functional modules for controlling certain features of the integration demand management system 105.

More particularly, the integration demand management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the integration demand management system 105 to communicate over the network 104 with the user devices 102, and illustratively comprises one or more conventional transceivers.

The integration demand management system 105 further comprises an integration demand portal 130, a machine learning natural language processing engine 132, and an artificial intelligence engine 134.

It is to be appreciated that this particular arrangement of modules 130, 132, 134 and 136 illustrated in the integration demand management system 105 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the integration demand portal 130, machine learning natural language processing engine 132, and artificial intelligence engine 134 may be implemented at least in part in the form of software that is stored in memory and executed by at least one processor.

It is to be understood that the particular set of elements shown in FIG. 1 for AI-based data integration demand management involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 130, 132, 134 and 136 of an example integration demand management system 105 in computer network 100 will be described in more detail with reference to the flow diagram of FIG. 4.

Accordingly, at least one embodiment of the invention includes enterprise data integration demand management using an AI-based multilayer perceptron. Such an embodiment includes implementing an integration repository (such as, for example integration repository 136 in FIG. 1) containing data pertaining to various fields describing and/or involved in data integrations. Also, as detailed herein, a machine learning natural language processing engine (e.g., engine 132 in FIG. 1) is used to read data integration demand details entered in the form of textual information (by at least one user of at least one user device (e.g., user device 102 in FIG. 1) via a portal (e.g., integration demand portal 130 in FIG. 1). An AI engine (e.g., engine 134 in FIG. 1) evaluates the processed demand information against the integration repository to provide at least one delivery date prediction to at least one user. Additionally or alternatively, if a delivery date is entered as part of the demand, then the AI engine will determine a confidence value attributable to the delivery date based at least in part on the level of complexity associated with the integration.

Accordingly, one or more embodiments include automatically determining data delivery delay estimations using an artificial neural network multilayer perceptron (ANN-MLP), as well as automatically generating AI-based risk score recommendations. In such an embodiment, a multilevel input layer ANN-MLP handles nominal variables and is interpretable such that relationships between different input factors and yield factors are displayed and/or observable. Such an ANN-MLP estimates a data delivery delay and resource allocation across devices and/or enterprise components, wherein the neurons of each sub-layer of the input layer of the ANN-MLP symbolize delay sources at different levels of the system, and the activation of one or more neurons represents the plausibility of being the source of an overall delay.

Figure 2:
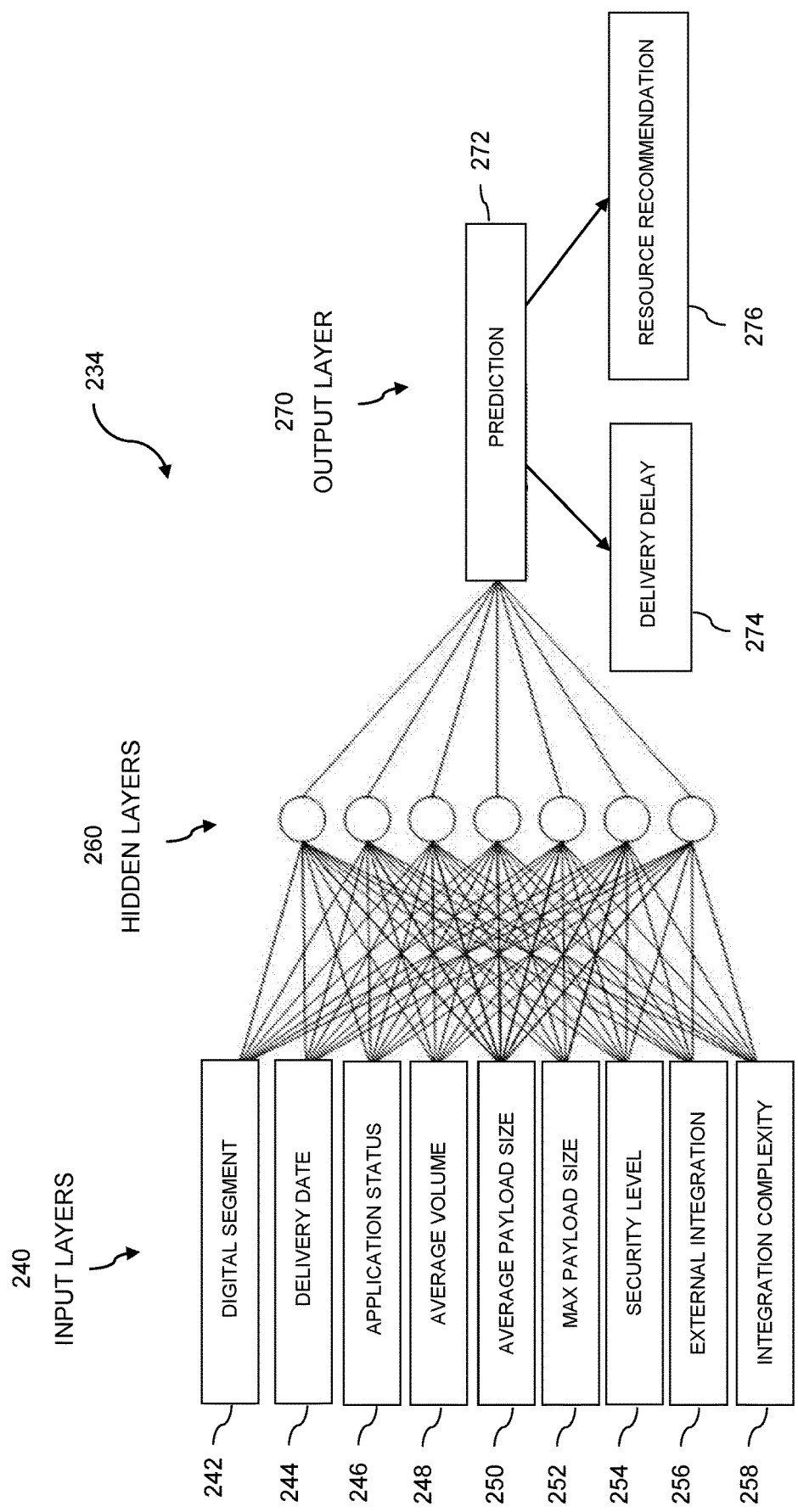
FIG. 2 shows an example neural network utilized in an illustrative embodiment.

FIG. 2 shows an example neural network 234 utilized in an illustrative embodiment. By way of illustration, the neural network 234 includes input layers 240, hidden layers 260, and output layer 270. The input layers 240 include digital segment information 242, delivery date information 244, application status information 246, as well as information pertaining to average volume 248, average payload size 250, and maximum payload size 252. Further, the input layers 240 also include security level information 254, external integration information 256, and integration complexity information 258. Additionally, output layer 270 includes a prediction 272, which can be used to determine a data delivery delay estimation 274 and a resource recommendation 276.

In one or more embodiments, the information contained within the input layers 240 is preprocessed, which can include performing one or more transformation actions and normalizing delay-related information (e.g., by dividing delay values by a maximum value). Also, at least one embodiment includes initializing a neural network (e.g., 234 in FIG. 2), which can include defining the structure of the neural network, setting the value of one or more weights associated with one or more connections, and defining an output formula for one or more neurons. In passing input data through the input layers 240 and hidden layers 260, the neural network 234 can generate a prediction 272 in the output layer 270, wherein the prediction pertains to data delivery delay(s) caused by various factors. Further, one or more embodiments can include setting the number of iterations as well as hidden layers, define at least one learning rate, and defining at least one learning formula for connection weights.

Accordingly, in at least one embodiment, an AI model can be implemented to determine a level of complexity associated with a data integration, which is used to estimate one or more delivery dates associated with the data integration, the measure of resources needed to carry out the data integration, and a level of certainty and/or confidence that the estimated delivery date will be met. Such determinations and/or outputs can, for example, facilitate enterprises to focus resources on more complex integrations and/or allocate the appropriate resources in connection with an informed temporal plan to increase overall enterprise efficiency.

Additionally, with respect to the determined levels of certainty and/or confidence that an estimated delivery date will be met, a certainty and/or confidence score that indicates a high risk of not meeting the demand could initiate a process wherein the timeline is moved back and/or one or more other input variables associated with the data integration demand are updated or modified. At least one embodiment can also include generating an output that includes a determined probability of successfully delivering the data integration at one or more times and/or dates subsequent to the estimated delivery date.

FIG. 3 shows example pseudocode for an AI model utilized in an illustrative embodiment. In this embodiment, pseudocode 300 is executed by or under the control of a processing system, such as integration demand management system 105, or another type of computing device. For example, the pseudocode 300 may be viewed as comprising a portion of a software implementation of at least part of AI engine 134 of the FIG. 1 embodiment.

The pseudocode 300 illustrates identification of one or more tuning parameters based on a grid search of an MLP. Specifically, as noted in the pseudocode 300, a grid search procedure (GridSearchCV) is used to build and assess one model for one or more combinations of parameters. Cross-validation (e.g., a three-fold cross-validation) is utilized to assess every individual model. The "epochs" refers to the number of iterations for the entire dataset used to train a neural network, and it can be observed how the total error changes with additional iterations. However, a correct epoch can be identified when the next additional epoch does not cause a further decrease in total error. Also, a learning rate value controls how much to update the weight at the end of each batch, and a momentum value controls how much to permit the previous update influence a current weight update. The learning rate can indicate how quickly a network is trained. For example, at fixed epochs, the learning rate can be increased each time iteration by 0.05. Further, an alpha parameter can be implemented to control the amount of regularization when applied to the network weights, and an activation function represents the nonlinearity used at the end of each neuron. Such an activation function can, for instance, affect convergence speed, particularly when the network extends beyond a given point.

It is to be appreciated that this particular pseudocode shows just one example implementation of an AI model utilized in an illustrative embodiment, and alternative implementations of the process can be used in other embodiments.

Figure 4:
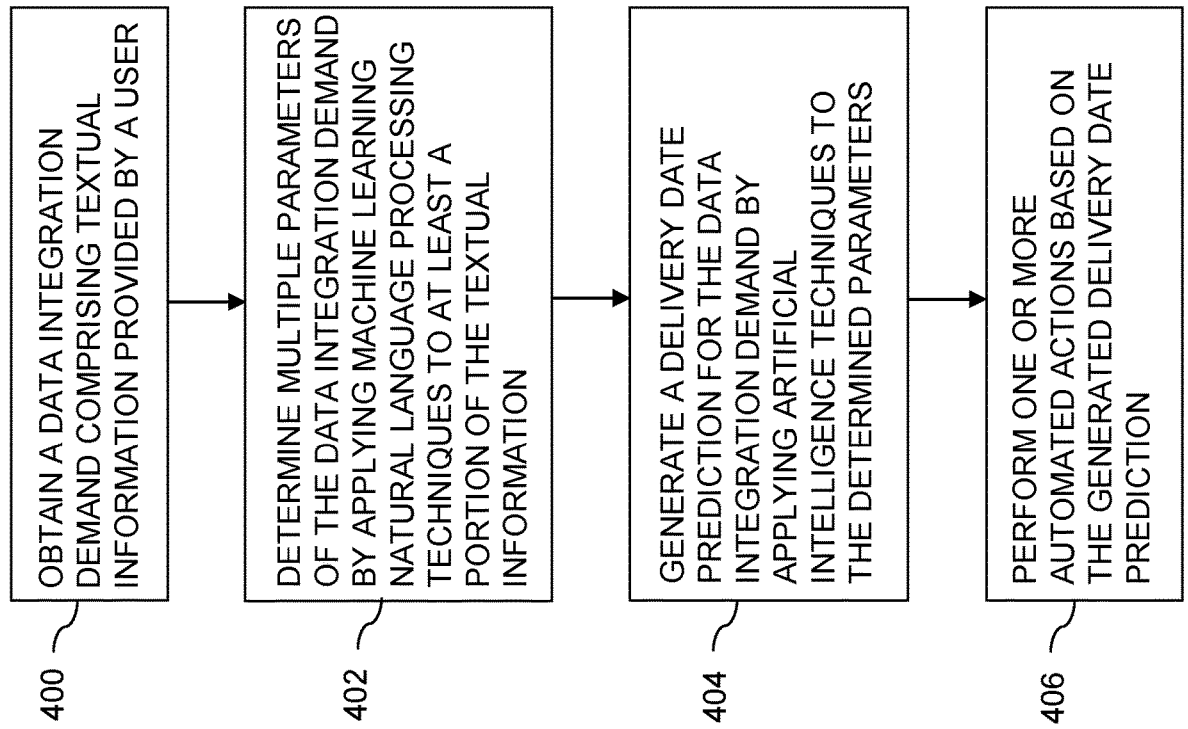
FIG. 4 is a flow diagram of a process for data integration demand management using AI in an illustrative embodiment.

FIG. 4 is a flow diagram of a process for data integration demand management using AI in an illustrative embodiment. It is to be understood that this particular process is only an example, and additional or alternative processes can be carried out in other embodiments.

In this embodiment, the process includes steps 400 through 406. These steps are assumed to be performed by integration demand management system 105 utilizing its modules 130, 132, 134 and 136.

Step 400 includes obtaining at least one data integration demand, wherein the at least one data integration demand comprises textual information provided by at least one user. Step 402 includes determining multiple parameters of the at least one data integration demand by applying one or more machine learning natural language processing techniques to at least a portion of the textual information provided by the at least one user. In one or more embodiments, the multiple parameters include information pertaining to two or more of: digital segment, initial delivery date, application status, type of engagement, type of data, external integration, average volume, maximum volume, average payload size, maximum payload size, parallelism, message service level agreements, message orchestration, message enrichment, one or more necessary security levels, one or more integration products, at least one data sender, at least one data receiver, product stability, and integration complexity.

Step 404 includes generating at least one delivery date prediction for the at least one data integration demand by applying one or more artificial intelligence techniques to the multiple determined parameters of the at least one data integration demand. In at least one embodiment, applying the one or more artificial intelligence techniques includes passing the multiple determined parameters through at least one neural network. Additionally or alternatively, applying the one or more artificial intelligence techniques can include passing the multiple determined parameters through at least one artificial neural network multilayer perceptron. In such an embodiment, one or more neurons of at least one sub-layer of an input layer of the at least one artificial neural network multilayer perceptron symbolize one or more delay sources associated with the at least one generated delivery date prediction. Further, activation of one of the one or more neurons represents plausibility of a respective one of the one or more delay sources being a source of delay, of an amount above a given threshold level, associated with the at least one generated delivery date prediction.

Step 406 includes performing one or more automated actions based at least in part on the at least one generated delivery date prediction. In at least one embodiment, performing the one or more automated actions includes computing a confidence value attributed to the at least one generated delivery data prediction based at least in part on a level of complexity associated with the at least one data integration demand. Additionally or alternatively, performing the one or more automated actions can include automatically modifying one or more resource allocations within at least one enterprise associated with resolving the at least one data integration demand, and/or outputting, to at least one integration repository, the at least one generated delivery date prediction and the multiple determined parameters of the at least one data integration demand. Further, in one or more embodiments, performing the one or more automated actions can include training the one or more artificial intelligence techniques using the at least one generated delivery date prediction and the multiple determined parameters of the at least one data integration demand, and/or outputting, to the at least one user, the at least one generated delivery date prediction. Such an embodiment can also include modifying at least one of the multiple determined parameters of the at least one data integration demand in response to input from the at least one user obtained in connection with the at least one generated delivery date prediction.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine predictive data integration demand delivery dates using AI techniques. These and other embodiments can effectively overcome challenges associated with human error and/or inaccuracy.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
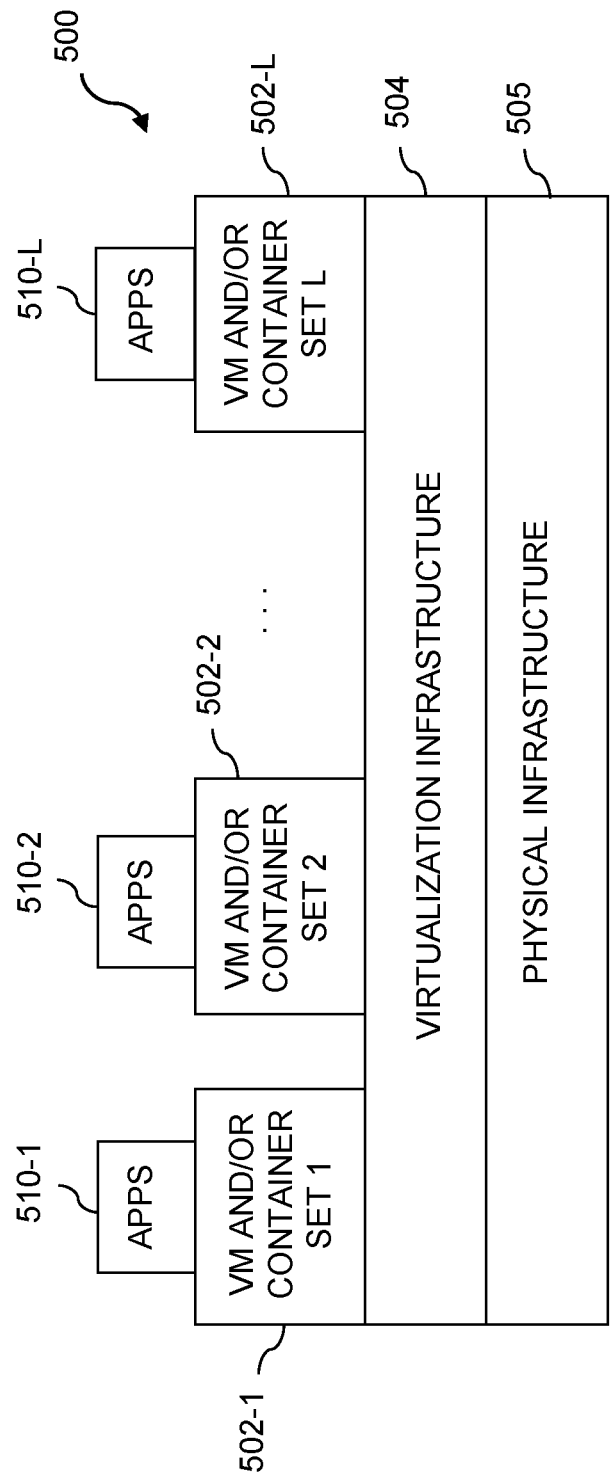
FIGS. 5 and 6 show examples of processing platforms that may be utilized to implement at least a portion of an information processing system in illustrative embodiments.
Figure 6:
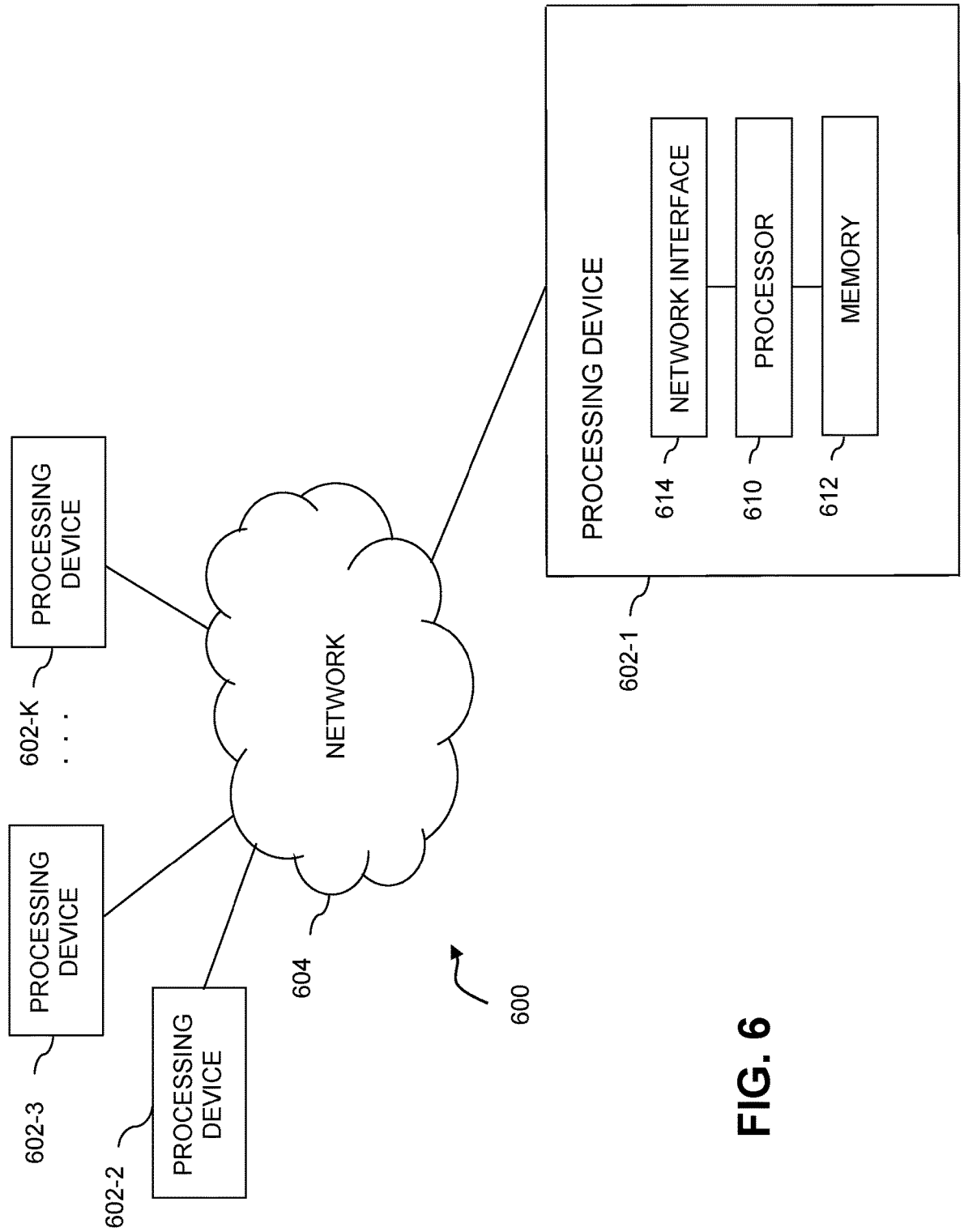

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining at least one data integration demand, wherein the at least one data integration demand comprises textual information provided by at least one user;
determining multiple parameters of the at least one data integration demand by applying one or more machine learning natural language processing techniques to at least a portion of the textual information provided by the at least one user;
generating at least one delivery date prediction for the at least one data integration demand by applying one or more artificial intelligence techniques to the multiple determined parameters of the at least one data integration demand, wherein applying the one or more artificial intelligence techniques comprises processing at least a portion of the multiple determined parameters using at least one artificial neural network, and wherein one or more neurons of at least one input layer of the at least one artificial neural network correspond to one or more delay sources associated with the at least one generated delivery date prediction; and performing one or more automated actions based at least in part on the at least one generated delivery date prediction, wherein performing the one or more automated actions comprises automatically modifying one or more resource allocations, within at least one enterprise associated with resolving the at least one data integration demand, in accordance with the at least one generated delivery date prediction;

wherein the method is performed by at least one processing device comprising a processor coupled to a memory.

2. The computer-implemented method of claim 1, wherein the at least one artificial neural network comprises at least one artificial neural network multilayer perceptron.

3. The computer-implemented method of claim 2, wherein one or more neurons of at least one sub-layer of an input layer of the at least one artificial neural network multilayer perceptron correspond to one or more delay sources associated with the at least one generated delivery date prediction.

4. The computer-implemented method of claim 3, wherein activation of one of the one or more neurons represents plausibility of a respective one of the one or more delay sources being a source of delay, of an amount above a given threshold level, associated with the at least one generated delivery date prediction.

5. The computer-implemented method of claim 1, wherein performing the one or more automated actions comprises computing a confidence value attributed to the at least one generated delivery data prediction based at least in part on a level of complexity associated with the at least one data integration demand.

6. The computer-implemented method of claim 1, wherein performing the one or more automated actions comprises outputting, to at least one integration repository, the at least one generated delivery date prediction and the multiple determined parameters of the at least one data integration demand.

7. The computer-implemented method of claim 1, wherein performing the one or more automated actions comprises training the one or more artificial intelligence techniques using the at least one generated delivery date prediction and the multiple determined parameters of the at least one data integration demand.

8. The computer-implemented method of claim 1, wherein performing the one or more automated actions comprises outputting, to the at least one user, the at least one generated delivery date prediction.

9. The computer-implemented method of claim 8, further comprising:

modifying at least one of the multiple determined parameters of the at least one data integration demand in response to input from the at least one user obtained in connection with the at least one generated delivery date prediction.

10. The computer-implemented method of claim 1, wherein the multiple parameters comprise information pertaining to two or more of: digital segment, initial delivery date, application status, type of engagement, type of data, external integration, average volume, maximum volume, average payload size, maximum payload size, parallelism, message service level agreements, message orchestration, message enrichment, one or more necessary security levels, one or more integration products, at least one data sender, at least one data receiver, product stability, and integration complexity.

11. A non-transitory processor-readable storage medium having stored therein program code of one or more software programs, wherein the program code when executed by at least one processing device causes the at least one processing device:

to obtain at least one data integration demand, wherein the at least one data integration demand comprises textual information provided by at least one user;

to determine multiple parameters of the at least one data integration demand by applying one or more machine learning natural language processing techniques to at least a portion of the textual information provided by the at least one user;

to generate at least one delivery date prediction for the at least one data integration demand by applying one or more artificial intelligence techniques to the multiple determined parameters of the at least one data integration demand, wherein applying the one or more artificial intelligence techniques comprises processing at least a portion of the multiple determined parameters using at least one artificial neural network, and wherein one or more neurons of at least one input layer of the at least one artificial neural network correspond to one or more delay sources associated with the at least one generated delivery date prediction; and to perform one or more automated actions based at least in part on the at least one generated delivery date prediction, wherein performing the one or more automated actions comprises automatically modifying one or more resource allocations, within at least one enterprise associated with resolving the at least one data integration demand, in accordance with the at least one generated delivery date prediction.

12. The non-transitory processor-readable storage medium of claim 11, wherein the at least one artificial neural network comprises at least one artificial neural network multilayer perceptron.

13. The non-transitory processor-readable storage medium of claim 11, wherein performing the one or more automated actions comprises computing a confidence value attributed to the at least one generated delivery data prediction based at least in part on a level of complexity associated with the at least one data integration demand.

14. An apparatus comprising:

at least one processing device comprising a processor coupled to a memory;

the at least one processing device being configured:

to obtain at least one data integration demand, wherein the at least one data integration demand comprises textual information provided by at least one user;

to determine multiple parameters of the at least one data integration demand by applying one or more machine learning natural language processing techniques to at least a portion of the textual information provided by the at least one user;

to generate at least one delivery date prediction for the at least one data integration demand by applying one or more artificial intelligence techniques to the multiple determined parameters of the at least one data integration demand, wherein applying the one or more artificial intelligence techniques comprises processing at least a portion of the multiple determined parameters using at least one artificial neural network, and wherein one or more neurons of at least one input layer of the at least one artificial neural network correspond to one or more delay sources associated with the at least one generated delivery date prediction; and to perform one or more automated actions based at least in part on the at least one generated delivery date prediction, wherein performing the one or more automated actions comprises automatically modifying one or more resource allocations, within at least one enterprise associated with resolving the at least one data integration demand, in accordance with the at least one generated delivery date prediction.

15. The apparatus of claim 14, wherein the at least one artificial neural network comprises at least one artificial neural network multilayer perceptron.

16. The apparatus of claim 14, wherein performing the one or more automated actions comprises computing a confidence value attributed to the at least one generated delivery data prediction based at least in part on a level of complexity associated with the at least one data integration demand.

17. The apparatus of claim 14, wherein performing the one or more automated actions comprises outputting, to at least one integration repository, the at least one generated delivery date prediction and the multiple determined parameters of the at least one data integration demand.

18. The apparatus of claim 14, wherein performing the one or more automated actions comprises training the one or more artificial intelligence techniques using the at least one generated delivery date prediction and the multiple determined parameters of the at least one data integration demand.

19. The apparatus of claim 14, wherein performing the one or more automated actions comprises outputting, to the at least one user, the at least one generated delivery date prediction.

20. The non-transitory processor-readable storage medium of claim 11, wherein performing the one or more automated actions comprises outputting, to the at least one user, the at least one generated delivery date prediction.

* * * * *